(12) United States Patent
Beck

(10) Patent No.: US 9,604,283 B2
(45) Date of Patent: Mar. 28, 2017

(54) ALIGNMENT DEVICE, ALIGNMENT ELEMENT FOR SUCH AN ALIGNMENT DEVICE, AND AN ALIGNMENT METHOD

(71) Applicant: Sauter Feinmechanik GmbH, Metzingen (DE)

(72) Inventor: Matthias Beck, Metzingen (DE)

(73) Assignee: SAUTER FEINMECHANIK GMBH, Metzingen (DE)

( * ) Notice: Subject to any disclaimer, the term of this patent is extended or adjusted under 35 U.S.C. 154(b) by 150 days.

(21) Appl. No.: 14/443,703

(22) PCT Filed: Nov. 7, 2013

(86) PCT No.: PCT/EP2013/003347
§ 371 (c)(1),
(2) Date: May 19, 2015

(87) PCT Pub. No.: WO2014/101975
PCT Pub. Date: Jul. 3, 2014

(65) Prior Publication Data
US 2015/0328692 A1     Nov. 19, 2015

(30) Foreign Application Priority Data

Dec. 24, 2012   (DE) ........................ 10 2012 025 399

(51) Int. Cl.
*G01B 5/25*      (2006.01)
*B23B 29/20*      (2006.01)

(52) U.S. Cl.
CPC ............... *B23B 29/20* (2013.01); *G01B 5/25* (2013.01); *B23B 2270/06* (2013.01)

(58) Field of Classification Search
CPC ........ B23B 29/20; B23B 2270/06; G01B 5/25
(Continued)

(56) References Cited

U.S. PATENT DOCUMENTS 2,875,662 A * 3/1959 Poorman ............... B23B 29/043
82/158
8,578,622 B2 * 11/2013 Sahm ..................... B23B 29/20
33/613
(Continued)

FOREIGN PATENT DOCUMENTS

CH           690 358 A5    8/2000
DE           3433696 A1    4/1985
(Continued)

*Primary Examiner* — G. Bradley Bennett
(74) *Attorney, Agent, or Firm* — Wenderoth, Lind & Ponack, L.L.P.

(57) ABSTRACT

The invention relates to an alignment device for precisely positioning a first functional element (103), particularly a retainer, on a second functional element (105), particularly a disc, these being detachably secured to each other. In the secured state (FZ), (a) at least one alignment element (115) is secured in a housing depression (117) of the first functional element (103) or the second functional element (105) by means of at least one securing element (131); (b) the alignment element (115) is connected to the first functional element (103) by means of at least one securing surface (119) and is in contact with a support surface (123) of said second functional element (105) by means of at least one contact surface (121); (c) a pre-tensioning device (125) acts between said contact surface (121) and support surface (123) and exerts a returning force, for returning to a starting position, onto the contact surface (121) and support surface (123) which are set one towards the other; and (d) the alignment element (115) is arranged laterally sunk into the housing depression (117), said contact surfaces (121) protruding above the lower side (133) of the first functional element (103). The invention is characterized in that in said secured state (FZ), the securing element (131) in question is arranged so as to be accessible from outside for the purpose of carrying out securing and/or justification processes, and (Continued)

Figure 7:
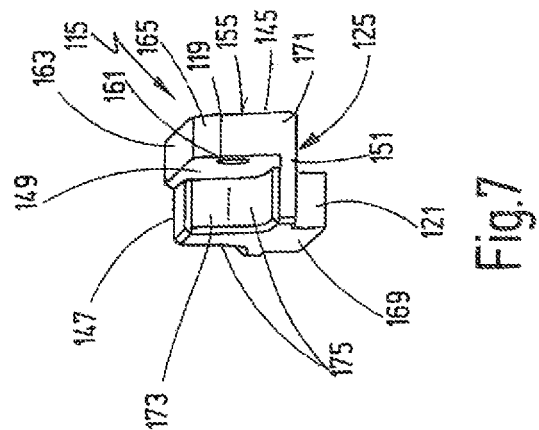

in that the contact surface (121) is provided on a protruding body section (169) in the form of a block-shaped alignment element (115) engagement section. The invention also relates to an alignment element for such an alignment device, and to an alignment method.

12 Claims, 4 Drawing Sheets

(58) Field of Classification Search
USPC .................................................. 33/613, 645
See application file for complete search history.

(56) References Cited

U.S. PATENT DOCUMENTS

| | | | |
|---|---|---|---|
| 2009/0090226 A1* | 4/2009 | Sahm | B23B 29/242 82/159 |
| 2012/0131809 A1* | 5/2012 | Sahm | B23B 29/20 33/645 |
| 2013/0157825 A1* | 6/2013 | Beck | B23B 29/20 82/159 |
| 2015/0328692 A1* | 11/2015 | Beck | B23B 29/20 33/645 |

FOREIGN PATENT DOCUMENTS

| | | |
|---|---|---|
| DE | 199 58 461 C1 | 3/2001 |
| DE | 20 2010 004 617 U1 | 7/2010 |
| EP | 0 780 179 A1 | 6/1997 |
| EP | 0 962 280 A2 | 12/1999 |
| JP | 2002-18608 A | 1/2002 |
| WO | WO 2007/031145 A1 | 3/2007 |
| WO | WO 2011/015253 A1 | 2/2011 |
| WO | WO 2012/031758 A1 | 3/2012 |

* cited by examiner

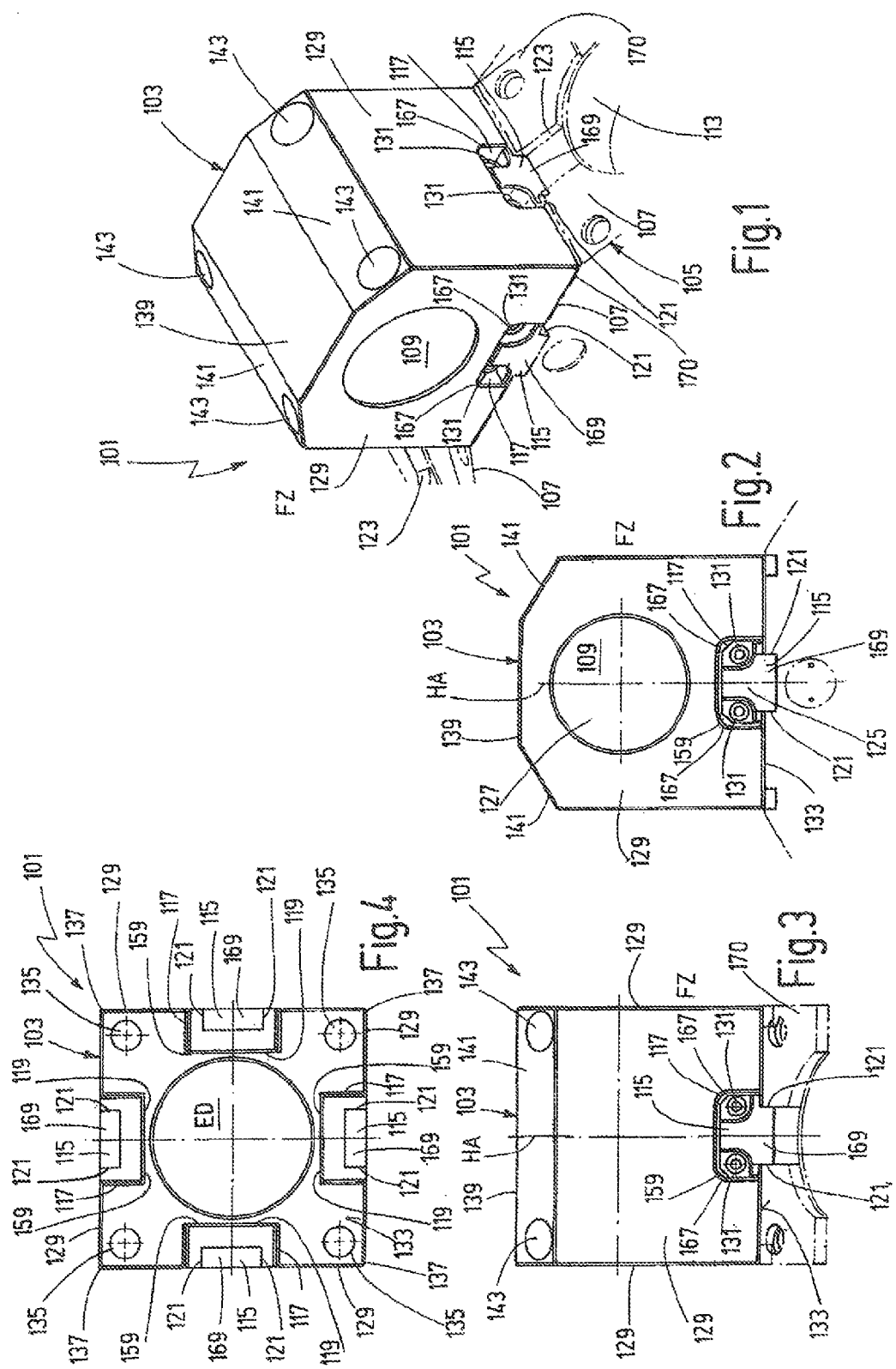

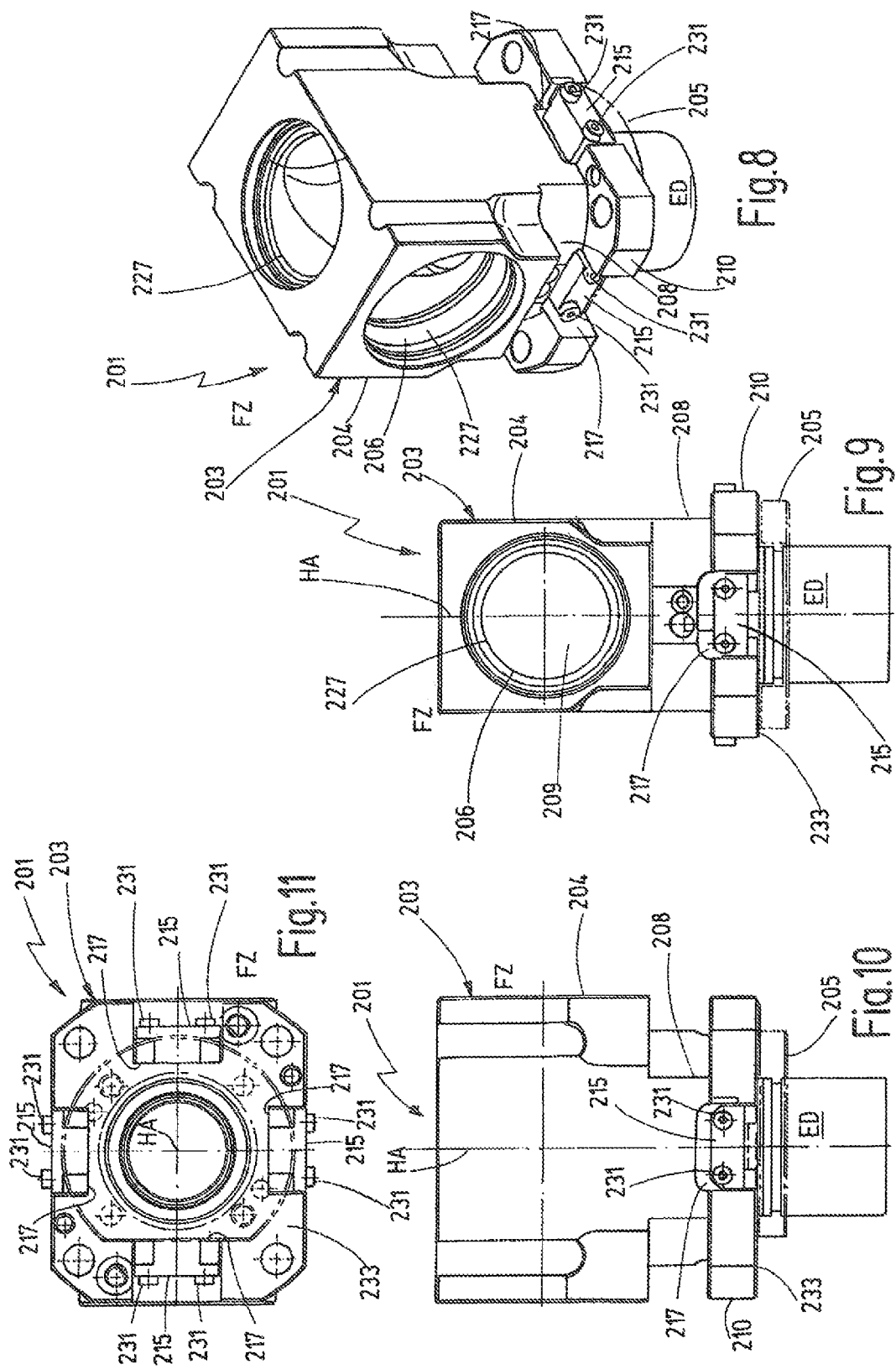

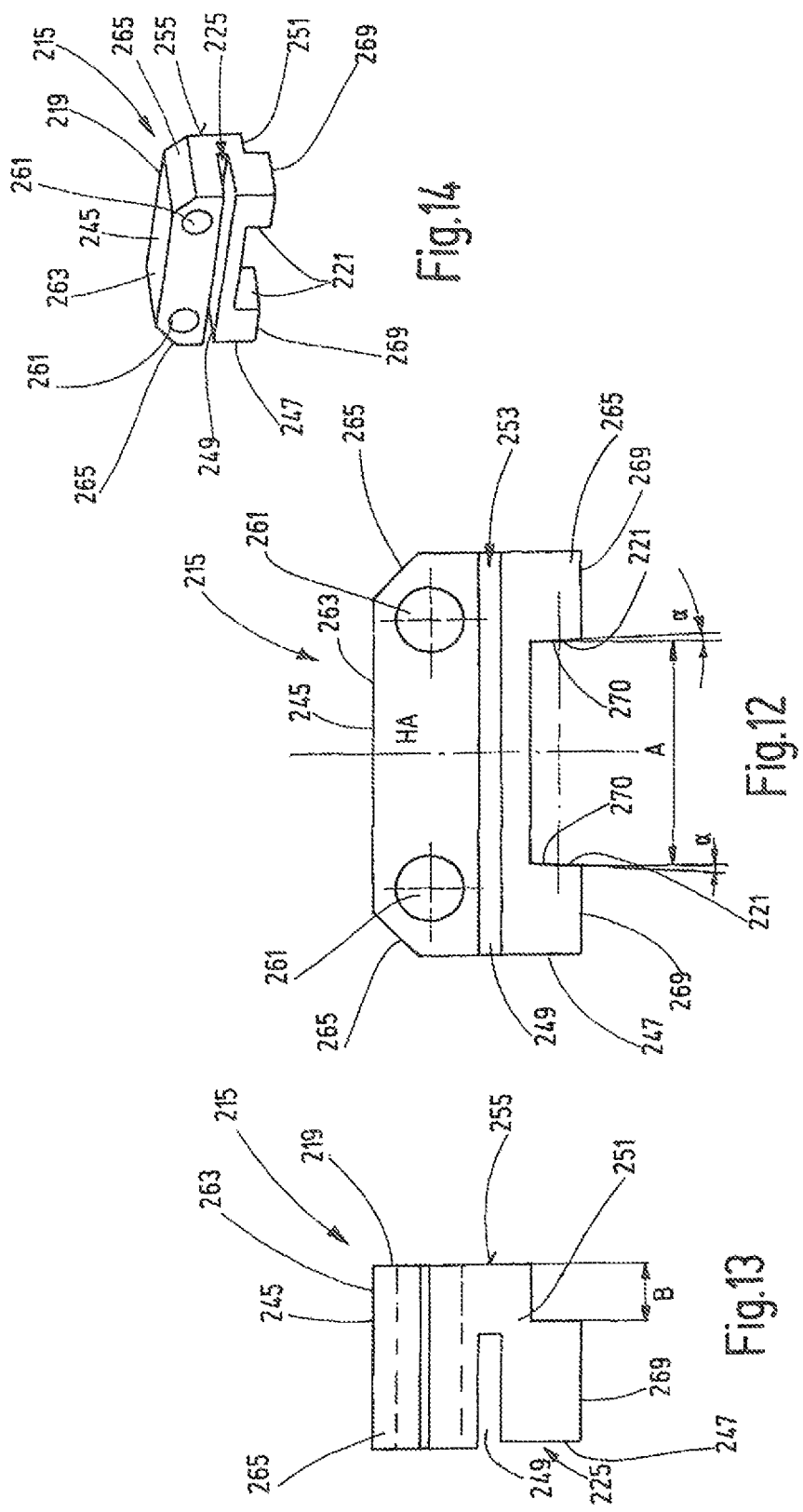

ALIGNMENT DEVICE, ALIGNMENT ELEMENT FOR SUCH AN ALIGNMENT DEVICE, AND AN ALIGNMENT METHOD

The invention relates to an alignment device for the precise positioning of a first functional element, in particular a retainer, on a second functional element, in particular a disk, these elements being detachably affixed to one another, wherein in the secured state (a), at least one alignment element is disposed such that it is secured in a recess in the housing of the first functional element or of the second functional element, said alignment element being at least partially accessible from the outside, by means of at least one securing element; (b) the alignment element is connected to the first functional element by means of at least one securing surface, and is in contact with a support surface of the second functional element by means of at least one contact surface; (c) a pre-tensioning device acts between the contact surface and the support surface, and exerts a returning force, for returning to a starting position, on the contact surface and support surface, which are set one toward the other; and (d) the alignment element is disposed such that it is laterally countersunk in the recess in the housing, wherein the contact surfaces protrude above the lower surface of the first functional element. The invention further relates to an alignment element for such an alignment device. Finally, the invention relates to an alignment method, in particular for the subsequent mounting of at least one alignment element on a functional unit, which comprises a first functional element and a second functional element.

Such disks are referred to as tool disks, and are used in industrial manufacturing when machining using machine tools. If a plurality of tool holders with tools (for example, fixed lathe tools or drivable cutting tools) allocated thereto are to be mounted around the circumference of the tool disk, such a configuration allows a very quick change to the tools needed for the machining in question by rotating the disk. Since only very minor manufacturing tolerances are frequently permitted when machining work pieces, a reproducibly defined positioning of the tool holders, and thus of the tools, with respect to the tool disk is essential for a meaningful use of a tool turret of this kind.

A tool turret, in particular for machine tools, having a took disk, which can be rotated about an axis of said turret, is known from Applicant's WO 2007/031145 A1, which tool turret has a plurality of tool stations distributed along the circumference thereof, each of which can be placed in at least one working position by rotating the tool disk, wherein a receiving means for a tool holder is provided in at least one part of the tool stations, and in each case, a fastening device is provided, in order to secure the tool holder to an appropriate receiving means in a defined position. Due to the fact that, in the known solution for positioning, at least one fitting body, which protrudes out of the receiving means, and which is elastically resilient perpendicular to said receiving means, as well as fitting bodies, which have been sunk in a base area of the tool holder in order to work in conjunction with at least one fitting body, are provided as alignment means, the known solution achieves an outcome in which, when the tool holder is affixed to the tool station of the fastening device, the desired setting position is assumed.

Starting from this prior art, the object of the invention is to provide an alignment device, an alignment element for such an alignment device, and an alignment method, by means of which it is possible to achieve a precise positioning of a first functional element with respect to a second functional element in a simpler, more cost-effective and more precise manner.

According to the invention, it is provided that, when in the secured state, the securing element in question is disposed in such a way that it is accessible from the outside for the purpose of carrying out securing and/or alignment processes, and in that the contact surface is provided on a protruding body section in the form of a block-shaped engagement section of the alignment element.

Due to the fact that the alignment element is disposed in the recess in the housing, which is accessible from the outside, on the one hand, a particularly space-efficient embodiment is disclosed, and on the other hand, a simplified, easy to monitor installation option is created, which opens up the possibility of later readjustment, including after a prolonged period of use, without requiring a complete disassembly of the alignment device such as is disclosed in the prior art. In addition, the recess in the housing can be used to align the alignment element with respect to one of the functional elements. Due to the fact that the alignment element has a pre-tensioning device, the first functional element can be initially roughly aligned with respect to the second functional element in order to produce a precise positioning. When securing the functional elements to one another, the precise alignment can then be obtained, due to the action of the pre-tensioning device. In this way, a substantially more precise positioning is brought about without absolutely requiring the use of high-precision measuring instruments to measure the precise position of the functional elements relative to one another.

The alignment device functions with a high degree of repetitive accuracy in the direction of the X, Y- and Z axes, for example using three or four alignment elements. The high degree of repetitive accuracy is achieved during installation through the use of the pre-tensioning of the alignment elements. Consequently, the system is "made responsive" by the contact surfaces of the alignment elements which are spring-loaded by the pre-tensioning device, and is therefore not overdetermined in any of the positioning axes.

An additional advantage is that the alignment elements can be produced separately, and subsequently affixed to one of the functional elements. As a result, these alignment elements can be cost-effectively produced in large numbers and replaced as needed.

In addition, the alignment device is compatible with the systems of different manufacturers and not dependent on the respective rest of the shape of the interface between the first functional element and the second functional element.

It may be particularly advantageously provided that the alignment element is disposed such that it is laterally countersunk in the recess in the housing, wherein the contact surfaces project above the lower surface of the first functional element. Thus the alignment element is accommodated in a protected location. In addition, a cover may be provided for the alignment element. Installation space can also be saved through the partial countersink in the recess in the housing. In this way, more first functional elements can be disposed on a second functional element on a given circumference.

It may be advantageously provided that a plurality of alignment elements, in particular three or such elements are disposed on the first functional element about a principal axis, such as the vertical axis, of the first functional element, such that the alignment elements are offset. As a result of this specific configuration, it is possible to align the first functional element in a plurality of directions with respect to the second functional element. In this way, the alignment of the first functional element is made more precise.

In addition, an alignment element is provided for such an alignment device. A slot may be provided in the alignment element in order to form the pre-tensioning device. Due to the slot, an alignment section of the alignment element can be elastically reset with respect to a mounting section of the alignment element. In this way, the first and the second functional element can be aligned with one another using an elastic pre-tensioning force. This elastic pre-tensioning force also remains in the loaded state and ensures the precise alignment of the functional elements relative to one another during operation.

The contact surface is provided on a protruding body section, a block-shaped engagement section, of the alignment element. The body section is preferably provided such that if is offset relative to the securing surface. This makes it possible for the body section and the contact surface provided thereon to be disposed such that they are radially offset outward with respect to the first functional element. In this way, a greater pre-tensioning force can be exerted on the support surface of the second functional element.

It may be particularly advantageously provided that the body section has contact surfaces on two opposite sides. Consequently, an alignment of the first functional element in two opposite directions is possible.

In addition, the alignment element may also have two body sections having contact surfaces provided thereon, which body sections are disposed such that they are spaced apart from one another. In this way, for example, it is possible to accommodate a counter piece of the second functional element with the support surfaces thereof between the body sections, said support surfaces can then can then be brought into contact with the contact surfaces.

The contact surface is preferably inclined with respect to a principal axis of the first functional element, and in particular, is oriented obliquely at an angle of no more than 5°, preferably no more than 2°. The slight incline makes it easier to position the first functional element with respect to the second functional element, and to carry out this positioning with a very high degree of precision.

The alignment element can be affixed to the functional element by means of two securing elements, in particular threaded bolts, wherein cut-outs are preferably provided on the alignment section for the securing elements. By using two securing elements, the alignment element can be more easily aligned with respect to the first functional element. In addition, the fastening is made more secure during operation by the redundant securing elements.

In addition, the invention relates to an alignment method, in particular for the subsequent mounting of at least one alignment element on a functional unit, which comprises a first functional element and a second functional element, wherein, in a first step, the two functional elements as well as at least one alignment element are secured to one another with a reduced tightening torque;

in a second step, the two functional elements are aligned with one another by means of an adjustment and/or measuring device such as a laser measuring device, a probe or an alignment template;

in a third step, the functional elements are secured to one another with full tightening torque; and in a fourth step, the alignment element is secured to the functional element in question with full tightening torque.

In addition, in an advantageous refinement of the alignment method, when using an easily configurable alignment template, the functional unit from the previous steps is also dismantled in a fifth step;

in a sixth step, the alignment template is removed, wherein the alignment element in question remains firmly connected to the functional element allocated thereto; and in a final step, the functional elements are again connected to one another through assembly for an intended use.

Figure 5:
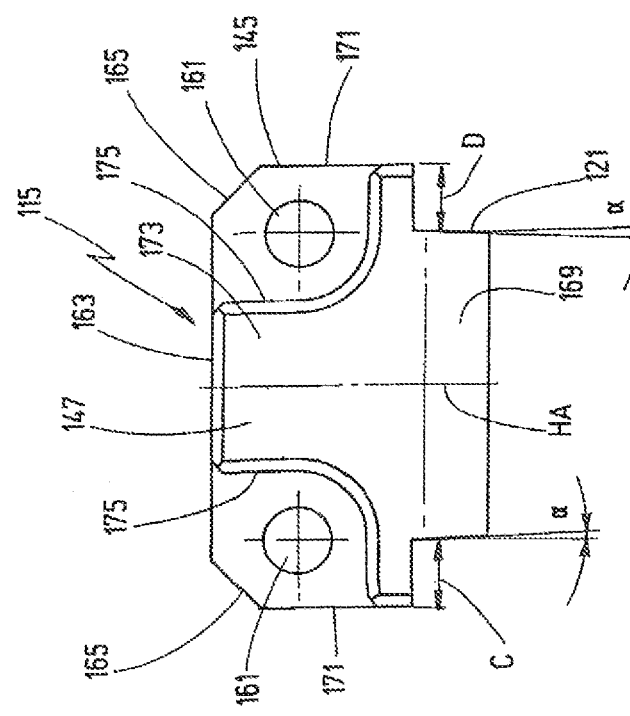
Figure 6:
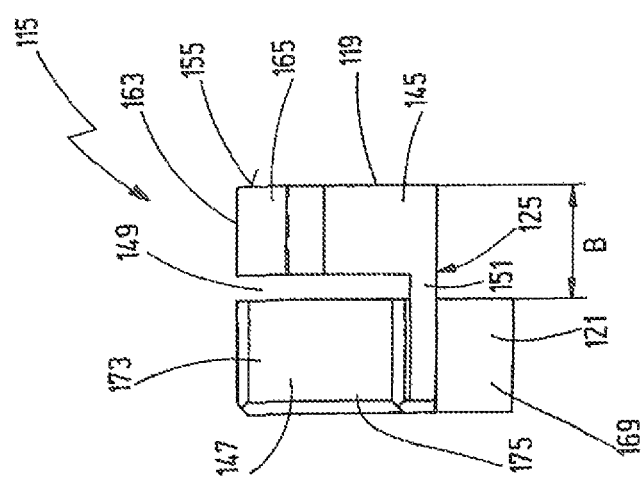

The invention is described in greater detail below on the basis of embodiments, which are depicted in the Figures. Shown are:

FIGS. 1 through 4 in a perspective view, two side views, which are offset to one another by 90°, and a bottom view of the alignment device according to the invention in accordance with a first embodiment;

FIGS. 5 through 7 two side views, which are disposed such that they are perpendicular to one another, and a perspective view of an alignment element of the alignment device according to FIGS. 1 through 4;

FIGS. 8 through 11 in a perspective view, two side views, which are disposed such that they are perpendicular to one another, and a bottom view of a second embodiment of the alignment device; and FIGS. 12 through 14 two side views, which are disposed such that they are perpendicular to one another, and a perspective view of an alignment element of the alignment device according to FIGS. 8 through 11.

FIGS. 1 through 4 show an alignment device 101 according to the invention in accordance with a first embodiment for the precise positioning of a first functional element 103, which in this case has a cubical shape, in particular a retainer for a tool, on a second functional element 105, in particular in the form of a disk, which is only shown in a small segment cutout, which are detachably affixed to one another. The tool disk 105, which can be coupled in a customary manner to a machine tool, which is not depicted here, thereby has a plurality of positions 107 each for a first functional element 103, which positions are evenly distributed on an outer circumference, and which are offset at an angle. By rotating the second functional element 105, the first functional element 103 and the tool 109 located thereon can be positioned accordingly, for example in order to machine a work piece (not depicted). In addition, damping adapters are provided in the second functional element 105.

A central opening 113 is located at each position 107 of the tool disk 105, in which an engaging prong ED of a first functional element 103 can be inserted and secured therein. To this end, the engaging mandrel ED has serrations on the outer circumference of a stepped surface thereof in a manner, which is known and therefore not depicted, with which serrations a hold-down clamp of the tool disk 105 engages, wherein the tool holder 103 is then drawn onto the rectangular contact surface of the tool disk 105. Despite this fastening of the tool holder 103 onto the tool disk 105, this fastening is not sufficient to allow a precise positioning 103 with respect to the tool disk 105 for the later targeted machining of work pieces (not depicted) by means of the machine tool. Instead of this fastening option, a catch mechanism may be implemented by means of an otherwise conventional coupling solution.

In accordance with the depiction according to FIG. 1, the tool holder 103 has a tool holder 109, which in the present case, is provided in order to receive a cutting tool, for example in the form of a lathe tool (not depicted). Instead of a cutting or machining tool, which is accommodated in a stationary manner, in accordance with other embodiments of the of the tool holder 103, rotating machining tools may also be accommodated, for example in the form of a milling or grinding plate. Even in the case of such an embodiment of the of the tool holder 103, the apparatus, which is described in greater detail below, may also be used in addition to alignment elements. In addition, to an average person skilled in the art in the field of tool turrets, it is intuitive that naturally different types of tool holders can be affixed to the outer circumference of the tool disk 105 in in the corresponding positions 107 as a first functional element 103, wherein not all positions 107 must be in use.

When the first functional element 103 is in the secured state FZ on the second functional element 105, in accordance with the depiction according to FIG. 1, at least one alignment element 115 is disposed in a recess in the housing 117 of the first functional element 103 such that said alignment element is accessible from the outside. The alignment element 115 is connected to the first functional element 103 by means of at least one securing surface 119 (FIG. 4, 7), and is in contact with a support surface 123 of the second functional element 105 by means of at least one contact surface 121. A pre-tensioning device 125 (FIG. 6) acts between the contact surface 121 and the support surface 123 (FIG. 1), and exerts a returning force, for returning to a starting position, on the contact surface 121 and support surface 123, which are set one toward the other.

Recesses 117 are centrally disposed in the lower part of each of the lateral surfaces 129 of the first functional element 103, in which recesses alignment elements 115 are affixed. The alignment elements 115 are held in the recess 117 by means of two threaded bolts 131. The recess 117 is accessible from the outside, and in addition, is designed such that the alignment element 115, which can be allocated thereto, extends over the lower surface 133 of the first functional section 103 outward. As is particularly evident in FIG. 4, a total of four recesses 117 are provided on the lower surface 133 of the first functional element 103, wherein an alignment element 115 is disposed in each recess. The alignment elements 115 are disposed such that they are offset by 90° from one another with respect to a principal axis HA, in this case, the vertical axis, of the first functional element 103. In addition to the alignment elements 115, protruding alignment pins 135 are provided in a conventional manner in the corners 137 of the lower surface 133 of the first functional element 103. On the upper side 139, the first functional element 103 is provided with two bevels 141, which have openings 143 for the installation of alignment pins 135.

The alignment element 115 of FIGS. 1 through 4 is depicted in detail in FIGS. 5 through 7. The alignment element 115 has a mounting section 145 and an alignment section 147. The two sections 145, 147 are separated by a slot 149, which extends vertically when viewed in the direction depicted FIGS. 1 through 3 and 4 through 7, so that the two sections 145, 147 are only connected to one another at the lower ends thereof by a tapered bridge section 151. Through the slotted design, the alignment element 115 is provided with a pre-tensioning device 125. In the secured state FZ, the slot 149 is oriented parallel to the vertical axis HA of the first functional element 103. In this way, the alignment section 147 can be elastically adjusted, and in particular, reset with respect to a mounting section 145. The mounting section 145 has the securing surface 119 on the reverse side thereof, which securing surface is provided in order to be brought into contact with a rear wall 159 of the recess 117 in question of the first functional element 103. In addition, the alignment section 145 is penetrated by two horizontally extending bores 161, in order that two threaded bots 131 can pass through the alignment section 145 for fastening to the first functional element 103. On the upper side 163, the alignment section 145 is provided with lateral bevels 165, which are adapted to the corner arcs 167 of the recess 117 in question. The alignment section 115 has a body section 169 in the form of a block-shaped engagement section, which is oriented downward and which thus protrudes above the lower surface 133 of the first functional element 3. The engagement section 169 is spaced apart from the securing surface 119 by the distance B. Contact surfaces 121 are formed laterally on the engagement section 169 on two opposite sides. The contact surfaces 121 are each inclined with respect to the vertical axis HA of the alignment section 115 at an angle of approximately 2°. In addition, the contact surfaces 121 are disposed such that they are offset inwardly by the distances C and D with respect to the lateral outer surfaces 171 of the alignment element 115.

The alignment section 115 has a counter piece 173 that is located opposite the body section 169. Two rounded cut-outs 175 in the form of bores for receiving the threaded bolts 131 are provided laterally in the counter piece 173, which engage in the threaded bores (not depicted) of the tool holder 103.

The above described alignment device may be used for an especially advantageous alignment method according to the invention. Since the above described alignment elements 115 are easily accessible from the outside as compared to known solutions, as is particularly shown in the depictions according to FIGS. 1 through 3, the necessary alignment processes can be implemented in a particularly simple manner. Even in the case of a prolonged period of use of the tool holder 103 in question on the tool disk 105, the alignment processes can be carried out again if needed, this in the case of a corresponding misalignment, without having to remove the retainer 103 from the tool disk 105, although a loosening of such a connection can be signaled. Insofar as existing tool disks 105 having retainers 103 are available on the market and are in use, which have no alignment apparatus, or which have a different type of alignment apparatus that is difficult to access or difficult to use, it is possible to machine the tool holder 103 in a simple manner such that it is possible to access the rear wall 159 in question from the outside, which then inwardly delimits the respective recess 117 produced in the retainer 103.

In the case of the alignment method, in a first step, the two functional elements 103, 105 as well as at least one alignment element 115 are secured to one another with a reduced tightening torque, which is to say, the engaging mandrel ED is not secured in the central opening 113 of each position 107, nor are the two threaded bolts 131 of each alignment element 115 secured. In a subsequent, second step, the two functional elements are preferably manually aligned with one another using an adjustment and/or measuring device (not depicted) such as a laser measuring device, a probe or an alignment template.

In a third step, the full tightening torque is then exerted on the engaging prong ED and in this way, the functional elements 103, 105 are secured to one another in the position, which was previously precisely determined. In the fourth, subsequent step, the alignment element 115 is then secured to the functional element 103 by means of the threaded bolts 131 with full tightening torque. Due to the eiastically resilient design of the alignment section 145 as compared to the alignment section 147 via the bridge section 151 with the formation of a vertical slot 149, it is possible to achieve a precise orientation of the alignment element 115 in question, because the entire surface of the reverse side 155 of the alignment element 115 can be supported on the rear wall 159 of the secured retainer 103, and likewise, the alignment element 115 can be supported on the two opposite support surfaces 123 of the receiving means 170 allocated thereto, via the two opposite contact surfaces 121 of the engagement section 169. Any irregularities or alignment errors can then be compensated for by means of the elastic resiliency of the alignment element 115, as described, wherein, due to the metal design of the alignment element 115, a corresponding reset force is created, which in turn acts on the tool holder 103 and positions that holder.

Depending upon the respective machining task, if a higher precision alignment of the tool holder 103 with respect to the tool disk 105 is needed, a plurality of alignment elements 115 in different alignment axes are needed, wherein a total of four alignment elements 115 may be used on four opposite sides of the tool holder 103.

Insofar as an alignment template (not depicted) is to be used as an adjustment and/or measuring device in a particularly simple manner and at a low cost, in a fifth, additional, step, the functional unit is once again to be disassembled; in a sixth step, the alignment template is to be removed accordingly, wherein the alignment element 115 in question remains firmly connected to the functional element 103, 105 allocated thereto; and in a final step, the functional elements 103, 105 are again connected to one another through assembly for an intended use.

FIGS. 8 through 11 show a second embodiment of the alignment device 201 having a first functional element 203. This first functional element 203 likewise has a mount 206 for a tool 209 in an upper section 204 thereof. To this end, the upper section 204 is provided with various openings 227. In a lower section 208, the first functional element 203 has a flange 210 or, respectively, a circumferential collar. Alignment elements 215 are disposed in the flange 210, such that they are countersunk in recesses 217. In turn, four alignment elements 215 are provided on the lower surface 233 of the first functional element 203, which are disposed such they are offset about the vertical axis HA, which is one of the principal axes of the first functional element 203. In so doing, the alignment elements 215 are centrally disposed on opposite sides of the functional element 203. The alignment elements 215 are each affixed to the first functional element 203 by means of two threaded bolts 231. In addition, these elements are completely accommodated in the flange 210.

The alignment element 215 is depicted in detail in FIGS. 12 through 14. This alignment section 215 also has a slot 249 between an upper alignment section 245 and a lower alignment section 247. In the secured state FZ of the alignment element 215, the slot 249 is oriented parallel to the lower surface 233 of the first functional element 203 and is facing inward. Due to the slot 249, the pre-tensioning device 225 in the alignment element 215 is designed such that the alignment section 245 can be elastically reset with respect to the alignment section 247. The upper alignment section 245 is likewise penetrated by two parallel bores 261 for threaded bolts 231. In addition, two bevels 265 are provided on the upper side 263 of the alignment element 215. On the reverse side 255, the alignment section 215 has a securing surface 219. The alignment section 245 transitions into an alignment section 247 via a bridge section 251. Two body sections 269 in the form of block-shaped engagement sections are formed on the alignment section 247. The two engagement sections 269 are disposed such that they are spaced apart from one another at a distance A and project downward. The engagement sections 269 are spaced apart from the securing surface 219 by the distance B. On the inner sides 270, the engagement sections 269 have contact surfaces 221 for receiving a counter piece, which is provided with support surfaces that correspond to the contact surfaces 221. The contact surfaces 221 are inclined or, respectively, oriented obliquely with respect to a vertical axis HA of the first functional element 203 by an angle of 2°. In the secured state FZ, the alignment section 247 is deflected with respect to the alignment section 245 and causes a pre-tensioning, which acts as a returning force in order to align the functional elements 203, 205.

By means of the alignment device 101, 201 according to the invention, the first functional elements 103, 203 can be positioned with respect to the second functional elements 105, 205 in a particularly simple and precise manner, with a high degree of reproduction accuracy due to the contact surfaces 121, 122, which are spring-loaded by the pre-tensioning device 125, 225. No additional tools are needed in order to carry out the positioning. The alignment elements 115, 215 can be produced in a cost-effective manner and can be retrofitted as needed and replaced in the event of wear.

The invention claimed is:

1. An alignment device for the precise positioning of a first functional element (103; 203), in particular a retainer, on a second functional element (105; 205) in particular a disk, these elements being detachably affixed to one another, wherein in the secured state (FZ),
at least one alignment element (115; 215) is disposed such that it is secured in a recess in the housing (117; 217) of the first functional element (103; 203) or of the second functional element (105; 205) by means of at least one securing element (131; 231);
the alignment element (115; 215) is connected to the first functional element (103; 203) by means of at least one securing surface (119; 219), and is in contact with a support surface (123) of the second functional element (105; 205) by means of at least one contact surface (121; 221);
a pre-tensioning devices 125; 225) acts between the contact surface (121; 221) and the support surface (123), and exerts a returning force, for returning to a starting position, on the contact surface (121; 221) and support surface (123), which are set one towards the other; and
the alignment element (115; 215) is disposed such that it is laterally countersunk in the recess in the housing (117; 217), wherein the contact surfaces (121; 221) protrude above the lower surface (133; 233) of the first functional element (103; 203),
characterized in that, when in the secured state (FZ), the securing element (131; 231) in question is disposed in such a way that it is accessible from the outside for the purpose of carrying out securing and/or alignment processes, and in that the contact surface (121; 221) is provided on a protruding body section (169; 269) in the form of a block-shaped engagement section of the alignment element (1 15; 215).

2. The alignment device according to claim 1, characterized in that a plurality of alignment elements (115; 215) are disposed on the first functional element (103; 203) about a principal axis (HA) of the first functional element (103; 203) such that said alignment elements are offset.

3. An alignment element for an alignment device according to claim 1, characterized in that the contact surface (121; 221) is provided on a protruding body section (169; 269), a block-shaped engagement section, of the alignment element (115; 215).

4. The alignment element according to claim 3, characterized in that, in order to form the pre-tensioning device (125; 225), a slot (149; 249) is provided in the alignment element (115; 215).

5. The alignment element according to claim 4, characterized in that, due to the slot (149; 249), an alignment section (147; 247) of the alignment element (115; 215) can be elastically reset with respect to an alignment section (145; 245) of the alignment element (115; 215).

6. The alignment element according to claim 3, characterized in that the body section (169; 269) is provided such that it is offset relative to the securing surface (119; 219).

7. The alignment element according to claim 3, characterized in that the body section (169) has contact surfaces (121) on two opposite sides.

8. The alignment element according to claim 3, characterized in that the alignment element (115; 215) has two body sections (269) having contact surfaces (221) provided thereon, which body sections are disposed such that they are spaced apart from one another.

9. The alignment element according to claim 3, characterized in that the contact surface (121; 22l) is inclined with respect to a principal axis (HA) of the first functional element (103; 203), and in particular, is oriented obliquely, at angle (a) of no more than 5°, preferably no more than 2°.

10. The alignment element according to claim 3, characterized in that the alignment element (115; 215) is affixed to the first functional element (103; 203) by means of two securing elements (131; 231), in particular threaded bolts, wherein cut-outs (175) are preferably provided on the alignment section (147) for the securing elements (131).

11. An alignment method, in particular for the subsequent mounting of at least one alignment element (115; 215) on a functional unit, which comprises a first functional element (103; 203) and a second functional element (105; 205), wherein,
- in a first step, the two functional elements (103, 105; 203, 205) as well as at least one alignment element (115; 215) are secured to one another with a reduced lightening torque;
- in a second step, the two functional elements (103, 105; 203, 205) are aligned with one another by means of an adjustment and/or measuring device such as a laser measuring device, a probe or an alignment template;
- in a third step, the functional elements (103, 105; 203, 205) are secured to one another with full lightening torque; and
- in a fourth step, the alignment element (115; 215) is secured to the functional element (103, 105; 203, 205) in question with full tightening torque.

12. The alignment method according to claim 11, characterized in that, in addition, when using an alignment template, the functional units from the previous steps
are also dismantled in a fifth, step;
in a sixth step, the alignment template is removed, wherein the alignment element (115; 21 5) in question remains firmly connected to the functional element (103, 105; 203, 205) allocated thereto; and
in a final step, the functional elements (103, 105; 203, 205) are again connected to one another through assembly for an intended use.

* * * * *